(12) United States Patent
Spampinato et al.

(10) Patent No.: US 7,397,944 B2
(45) Date of Patent: Jul. 8, 2008

(54) PROCESSING PIPELINE OF PIXEL DATA OF A COLOR IMAGE ACQUIRED BY A DIGITAL SENSOR

(75) Inventors: Giuseppe Spampinato, Catania (IT); Francesco Pappalardo, Paternò (IT); Paolo Antonino Foderá, Marsala (IT); Francesco Virlinzi, Enna (IT); Alessandro Capra, Gravina di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 616 days.

(21) Appl. No.: 11/119,223

(22) Filed: Apr. 29, 2005

(65) Prior Publication Data
US 2005/0280725 A1 Dec. 22, 2005

(30) Foreign Application Priority Data
Jun. 11, 2004 (EP) .................................. 04425433

(51) Int. Cl.
G06K 9/00 (2006.01)
G06K 9/36 (2006.01)
G06F 3/038 (2006.01)
H04N 9/04 (2006.01)

(52) U.S. Cl. ...................... 382/162; 382/232; 345/204; 348/210.99

(58) Field of Classification Search ......... 382/162–167, 382/232–253, 302–304; 345/204–207, 530–574; 358/1.16–1.18, 505–540, 426.01–426.09, 358/474–498; 348/209.99–210.99, 234–247, 348/266–280, 500–504

See application file for complete search history.

(56) References Cited

U.S. PATENT DOCUMENTS

| | | | | |
|---|---|---|---|---|
| 4,475,732 A | * | 10/1984 | Clausing et al. | ................. 271/34 |
| 4,631,750 A | * | 12/1986 | Gabriel et al. | ............... 382/277 |
| 4,908,874 A | | 3/1990 | Gabriel | ......................... 382/41 |
| 5,559,954 A | * | 9/1996 | Sakoda et al. | ................ 345/546 |
| 5,589,418 A | * | 12/1996 | Kalnitsky | .................... 438/384 |
| 5,608,856 A | * | 3/1997 | McInally | ..................... 345/442 |
| 5,654,742 A | * | 8/1997 | Priem et al. | .................. 345/545 |
| 5,801,776 A | * | 9/1998 | Tamura et al. | .......... 375/240.18 |
| 5,878,173 A | * | 3/1999 | Hashimoto et al. | ........... 382/282 |
| 5,920,645 A | * | 7/1999 | Aida | ........................... 382/167 |
| 6,587,602 B2 | * | 7/2003 | Wakisawa et al. | ............ 382/298 |
| 6,587,603 B1 | * | 7/2003 | Sakurai et al. | ............... 382/312 |

(Continued)

Primary Examiner—Bhavesh M. Mehta
Assistant Examiner—Manav Seth
(74) Attorney, Agent, or Firm—Allen, Dyer, Doppelt, Milbrath & Gilchrist, P.A.; Lisa K. Jorgenson

(57) ABSTRACT

A color image processing pipeline performs an interpolation on color data to generate triplets located at distinct pixel locations. The pipeline includes defect correction and image enhancement blocks having a first color interpolation block for generating RGB information for each pixel of an input image pixel pattern, and a second color interpolation block for receiving the RGB information to provide enhanced RGB pattern pixels. Dedicated line memories and delay circuits associated with the defect correction and image enhancement blocks permit real-time processing of pixel data. First and second read/write buffers store a subset or pixel block of the image data, and invert a scanning mode of pixel data being fed to the dedicated line memories and delay circuits associated to at least the first color interpolation block, from row-wise to column-wise, for each subset of data to be stored therein.

16 Claims, 8 Drawing Sheets

U.S. PATENT DOCUMENTS

| | | | |
|---|---|---|---|
| 6,642,962 B1 | 11/2003 | Lin et al. | 348/252 |
| 7,133,073 B1 * | 11/2006 | Neter | 348/272 |
| 7,149,362 B2 * | 12/2006 | Lafruit et al. | 382/240 |
| 2003/0043159 A1 | 3/2003 | Slavin | 345/559 |
| 2003/0160894 A1 * | 8/2003 | Nagasaki | 348/441 |
| 2005/0207498 A1 * | 9/2005 | Vitali et al. | 375/240.16 |
| 2006/0204112 A1 * | 9/2006 | Yamaguchi et al. | 382/232 |

* cited by examiner

PROCESSING PIPELINE OF PIXEL DATA OF A COLOR IMAGE ACQUIRED BY A DIGITAL SENSOR

FIELD OF THE INVENTION

The present invention relates to image acquisition and image data processing methods and devices. More particularly, the present invention relates to a pipeline for generating a high quality color image by interpolating color data of pixel data provided by an image sensor to output interpolated image pixel data.

BACKGROUND OF THE INVENTION

Generally, when using a video camera or a digital still camera to photograph a color image, the incident light passes through filters for extracting certain wavelength components, such as the basic color components R (red), G (green) and B (blue). In a two-dimensional image, the imaging unit is composed of many pixels arranged in the vertical and horizontal directions. Each pixel of the two-dimensional image contains either red, green or blue color light because of the filtering of the incident light.

According to one of several alternative techniques, the type of filter is changed for every pixel and the filters are cyclically aligned in the order: R, G, B, R, G, B in the horizontal direction. This defines the color of the pixels aligned on a horizontal line of the pixel array of the sensor.

As a consequence, information of the photographed colored object is obtained only once every three pixels. In other words, an object cannot be color photographed other than in units of three pixels.

To reconstruct all the pixels of the two-dimensional image of the photographed object, it is necessary to interpolate color pixel data to obtain the color components of red, green and blue color using information contained in neighboring pixels of the pixel to be reconstructed/enhanced.

Generally, a value corresponding to the interpolated pixel is reconstructed by averaging corresponding values of a plurality of pixels surrounding the location of the pixel to be interpolated. Alternatively, the interpolated pixel may be determined by averaging the values of the pixels remaining after discarding pixels of maximum and minimum values of the neighboring pixels of the pixel to be interpolated. Also well known are techniques for detecting an edge of a photographed object by analyzing the pixels surrounding the considered cluster.

U.S. Pat. No. 5,373,322; U.S. Pat. No. 5,053,861; U.S. Pat. No. 5,040,064; U.S. Pat. No. 6,642,962; U.S. Pat. No. 6,570,616; U.S. published Patent Application No. 2003/0053687; U.S. Published Patent Application No. 2003/0007082; U.S. published Patent Application No. 2002/0101524; U.S. Pat. No. 6,366,694; European Patent Publication No. 0 497 493; European Patent Publication No. 1 176 550; and European Patent Publication No. 1 406 447 disclose techniques that are used in image processing.

Generally, the data acquired by the sensor according to a special pattern, for example the one known in the art as a Bayer color-filter array (CFA), the pattern of which is shown in FIG. 1, is characterized by associating just one of the three basic color components to each pixel. Therefore, a good quality RGB image is obtained by a specific image processing sequence (via hardware or an image generation pipeline (IGP) or via software) to generate a high quality color image. Generally, in cascade of such an image processing subsystem is associated a data compression block for reducing the band necessary for transmitting the color reconstructed image from the image processing subsystem or mass storage support, or to a remote receiver or a display unit.

Data, for example in the Bayer format, as acquired by a digital sensor, clearly represents a gross approximation of the chromatic components of the reproduced scene. It is very-importance that the accuracy of the color reconstruction via interpolation algorithms be performed on the raw data acquired by the digital sensor.

FIG. 2 illustrates a functional block diagram of a state-of-the-art image generating pipeline (IGP) for processing raw image data as acquired by a digital sensor according to a Bayer pattern to produce a high quality image in either a CIF or a QCIF format. The high quality image is to be eventually compressed by the CODEC block either in a JPEG or MPEG4 format or another similar type format for storing or transmitting the image.

The algorithms carried out by the IGP pipeline following the pre-processing block are described below, assuming for evaluation purposes, that the sensor provides a 644*484 Bayer pixel array. The IGP performs the following four sequential steps:

Defect Correction: The function of the block Def Corr is to correct various sensor damages resulting in the failure of single pixels. For the majority of applications it renders tolerable the use of sensors having a total number of single pixel defects below a certain limit. Def Corr operates a 5×5 filtering action, therefore, it loses four rows and four columns.

Color Interpolation 1: The function of the block Col Int 1 is to generate proper RGB information for each pixel of the sensor array from the Bayer pattern data. Col Int 1 operates a 5×5 filtering action, therefore, it loses four rows and four columns.

Color Interpolation 2: The function of the block Col Int2 is that of a low-pass filter. It receives the RGB pattern pixels output by the preceding block and outputs Col Int 1 RGB pixels of enhanced definition. Col Int 2 operates a 3×3 filtering action, therefore, it loses two rows and two columns.

Colored Matrix+Aperture Correction+Gamma Correction: The function of the components of this composite block may be recalled as follows.

Col Mat improves color rendition and color saturation of the image. In particular, it corrects the spectral sensitivities of the imaging sensor for enhancing chromaticity of the display in consideration of the characteristics of human sight. Col Mat has no losses of rows or columns.

Ap Corr corrects out-of-focus appearance caused by the weighed average processing, by locally enhancing contrast at contours. Ap Corr operates a 3×3 filtering action, therefore, it loses two rows and two columns.

Gamma compensates display characteristics of monitors. This is done by using a LUT (look-up-table) that can be effectively used to simultaneously correct brightness. The Gamma block has no losses of rows or columns.

Therefore, the combined processing block has a loss of two columns. Because of the various filters, a total of 12 rows and 12 columns will be lost, therefore, the final image will include 632×472 pixels. To obtain a VGA image (640×480), 8 rows and 8 columns are to be recovered.

After the application of Def Corr, 4 rows and 4 columns are recovered. After the application of Col Int 2, 2 rows and 2 columns are recovered. After the application of Apcor, 2 rows and 2 columns are recovered.

This can be arranged in different ways. In the analysis presented herein the choice has been of known IGP architectures of this type. However, they have the drawback of accounting for a burdensome overhead in reading from and writing data in the RAM at every step of the processing.

For the sample application considered:

Readings from the RAM:

Def Corr: [(5×644)×480]/2=772,802 words (1 word=2 short int=32 bit);

Col Int 1: [(5×640)×476]/2=761,600 words;

Col Int 2: [(3×3)×640×478]/2=1,376,640 words;

Ap Corr, Col Mat, Gamma: [(3×3)×640×478]/2=1,376,640 words;

Total readings from the RAM: 4,287,682 words

Writings in the RAM:

Def Corr: [(640)×480]/2=153,600 words (1 word=2 short int=32 bit);

Col Int 1: [3×(640)×480]/2=460,800 words;

Col Int 2: [(3)×638×478]/2=457,446 words;

Ap Corr, Col Mat, Gamma: [3×640×480 ]/2=460,800 words;

Total writings in the RAM: 1,532,646 total number of processed pixels in each block of the pipeline

Def Corr: (640×480)=307,200 pixels;

Col Int 1: (640×480)=307,200 pixels;

Col Int 2: 3×(638×478)=914,892 pixels;

Ap Corr, Col Mat, Gamma: 3×(640×480)=921,600 pixels;

Total number of processed pixels: 2,450,892 pixels;

Arrays shift: 0;

Extra memory requested to store the intermediate arrays: 0.

It may be observed that there is no computational overhead. In contrast, there is a large overhead in reading and writing data at every step that causes a high number of Dcache misses. Moreover, the processed image is stored as a whole in the RAM only after the IGP ends.

FIG. 3 shows a possible hardware architecture for the IGP of FIG. 2. Data is read from the embedded RAM in raster mode with the above-specified constraints, and the hardware scheme of FIG. 3 highlights the sizes of the line memories (LM) that are required.

Some of the line memory blocks include delay circuits (LM+D) necessary to filter the data. If m*n is the size of the filter, m lines of n delays circuits are needed to make available the filter m*n data to the functional block.

The interconnections of (n−1) line memories and (m−1) delay circuits to obtain the data for a 5*5 filter are shown in FIG. 4. As may be observed from the scheme of FIG. 3, all line memories that are needed in a hardware implementation of an IGP pipeline have the length of a full line of pixels of the input Bayer image. This weighs the total memory resources that are needed.

Although, as already noted above, the Codec block that generally follows (in cascade) the IGP pipeline, commonly operates sequentially on blocks of pixels into which a full image is divided. It would appear sensible to devise an IGP pipeline that would work on blocks of pixels in which the input image could be divided in compliance with the input requisites of the Codec block, but this approach has not been so far followed. This evident dismissal of the idea of implementing an IGP pipeline that could work in a "block mode" rather than in "raster mode" is due to the stringent quality requirements that certain basic functions that the IGP pipeline is intended to perform. In particular, the color information reconstruction by interpolation algorithms of pixels is a basic function to perform.

On account of an imposed uncompromised quality of color information reconstruction pixel-by-pixel from Bayer (or alike) data, if a block mode processing is considered in lieu of a raster mode processing, a substantial overlapping of the blocks of a subdivision of the pixels of the input image becomes mandatory and this will significantly increase computational overhead. This occurs because the non-linear filters (m*n) that are implemented in the IGP pipeline of the image pixels produce an output (i*j), where i<m and j<n.

Therefore, if two consecutive blocks of a subdivision of the image are not overlapped (by a quantity (m-i) in one direction or of (n-j) in the other direction), the contours of objects of the scene reproduced in the image could be lost. Consequently, the computational overhead that would be necessary to account for passing from a raster mode to a block mode architecture of an IGP pipeline practically nullifies any savings that may be achieved in terms of the total memory requirement.

SUMMARY OF THE INVENTION

An object of the present invention is to overcome the above discussed design constraint inefficiencies and practical impediments to achieve a reduction in the total memory required of an IGP pipeline generating enhanced RGB information for each pixel of an input image pixel pattern without introducing a significant computational overhead.

In accordance with the present invention, the total memory requirement (input buffers+line memories) may be reduced to about 89% in an IGP pipeline operating in a block mode instead of a raster mode, provided that the direction of scanning of each subset or block of pixels in which an input image is subdivided, commonly stored in dedicated memory buffers, be inverted from row-wise to column-wise or vice-versa with respect to the way the data is written in the buffers depending on the direction of scan of the blocks of the sequential subdivision of the image.

According to one aspect of the invention, for a processed subset or block of pixels of certain dimensions (X, Y) to be output by the processing pipeline, the dimensions of the subset or pixel block of image data written in a row-wise direction (horizontal) and read from the buffers in column-wise direction (vertical) will be:

$$X*SF_{hor}+OV_{hor} \text{ and } Y*SF_{ver}+OV_{ver} \text{ respectively, and}$$

where SF is the scaling factor in the respective dimension, and OV is a measure of the computational overhead in the respective dimension corresponding to the number of line's and columns that are lost in the image processing pipeline and which advantageously becomes null for the horizontal dimension due to the translation of the direction of the scan mode of the input buffers when reading pixel data to be fed to the functional block of the image processing pipeline.

BRIEF DESCRIPTION OF THE DRAWINGS

The peculiarities and affects of the color image pixel data processing pipeline and related method of reducing line memory requirements of the present invention will be illustrated in detail in the following description of an example of one embodiment of the invention, while making reference to the attached drawings, wherein.

DETAILED DESCRIPTION OF THE PREFERRED EMBODIMENTS

Figure 6:
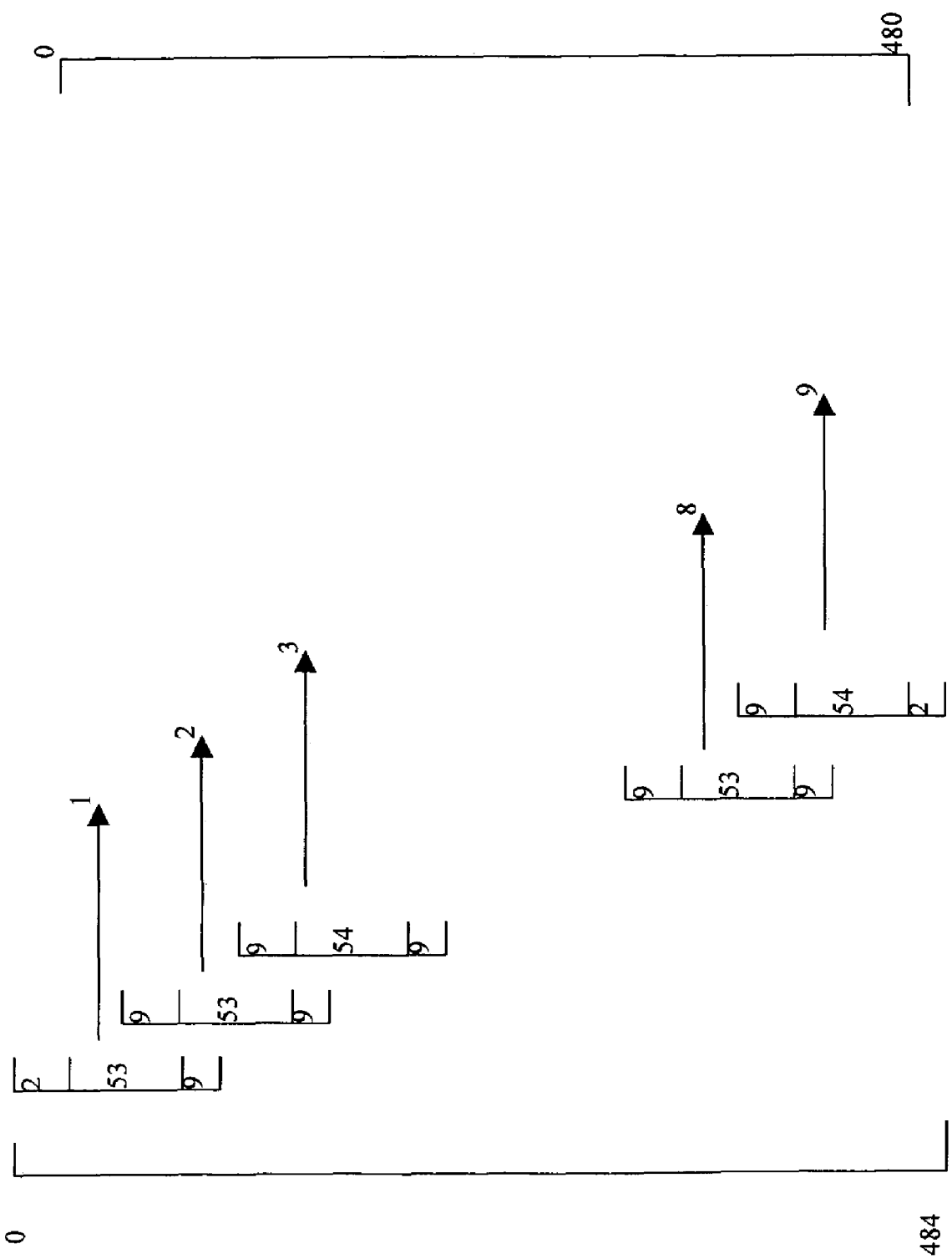
FIG. 6 schematically shows the vertical overlapping of the blocks of pixels of a subdivision of a VGA image that is to be accounted for according to the present invention.

According to the present invention, computational overhead in considering a processing per blocks of pixels by an IGP pipeline may be graphically illustrated as in FIG. 6. By translating from row-wise to column-wise the scanning of a block of pixels of a subdivision of an input image, commonly acquired by writing them in an input buffer, the horizontal overhead is practically eliminated. This is while retaining a vertical overhead.

For the application considered, there are some constrictions, in the dimensions X and Y of the block of pixels in which the image is divided.

a. Scaling factor: for the sample application considered the output block size is 16×16, therefore the starting block size is $(16 \cdot SF_{hor} + OV_{hor}) \times (16 \cdot SF_{ver} + OV_{ver})$, where SF is the scaling factor in one dimension and OV is the total overhead in the same dimension (number of lines or columns lost in the IGP).

b. Overhead: only vertical overhead exists; the larger the vertical size of the buffer the smaller is the impact of the overhead.

Clearly, the restrictive condition is a). The scaling factor from VGA format to CIF and QCIF is as follows:

Scaling factor from VGA (640 × 480) to:
CIF (352 × 288) = 1.82 × 1.67
QCIF (176 × 144) = 3.64 × 3.34
Max Overhead = 18

The block sizes in accordance with the scaling factors and the maximum overhead are shown in the following table.

TABLE I

Needed block size from Bayer VGA to the given output format

| Output Type | 4:2:2 | 4:2:0 | RASTER |
|---|---|---|---|
| VGA | (16 + ov) × (8 + ov) | (16 + ov) × (16 + ov) | (16 + ov) × (1 + ov) |
| CIF | (30 + ov) × (14 + ov) | (30 + ov) × (27 + ov) | (30 + ov) × (2 + ov) |
| QCIF | (59 + ov) × (27 + ov) | (59 + ov) × (54 + ov) | (59 + ov) × (4 + ov) |

While QCIF is a quarter of the CIF, there is not a direct relation between VGA and either CIF or QCIF. Therefore, if the input image is a VGA Bayer image and the output is a QCIF image, the block size is to be selected according to the following considerations.

Horizontal Block Size

640/176=3.63636363, therefore:

16×3.63636363=58.18181818=58+2/11;

from which it follows that the vertical dimension of the buffer must be:

58+2/11, 58+4/11, 58+6/11, 58+8/11, 58+10/11, 59+1/11, 58+3/11, 58+5/11, 58+7/11, 59+9/11, 59.

Therefore, using this sequence, 11 blocks are needed

Vertical Block Size

480/144=3.3333333, therefore:

16×3.3333333=53.3333333=53+1/3 from which it follows that the vertical dimension of the buffer must be:

53+1/3, 53+2/3, 54, 53+1/3, 53+2/3, 54, 53+1/3, 53+2/3, 54.

Therefore, using this sequence, 9 blocks are needed.

Figure 1:
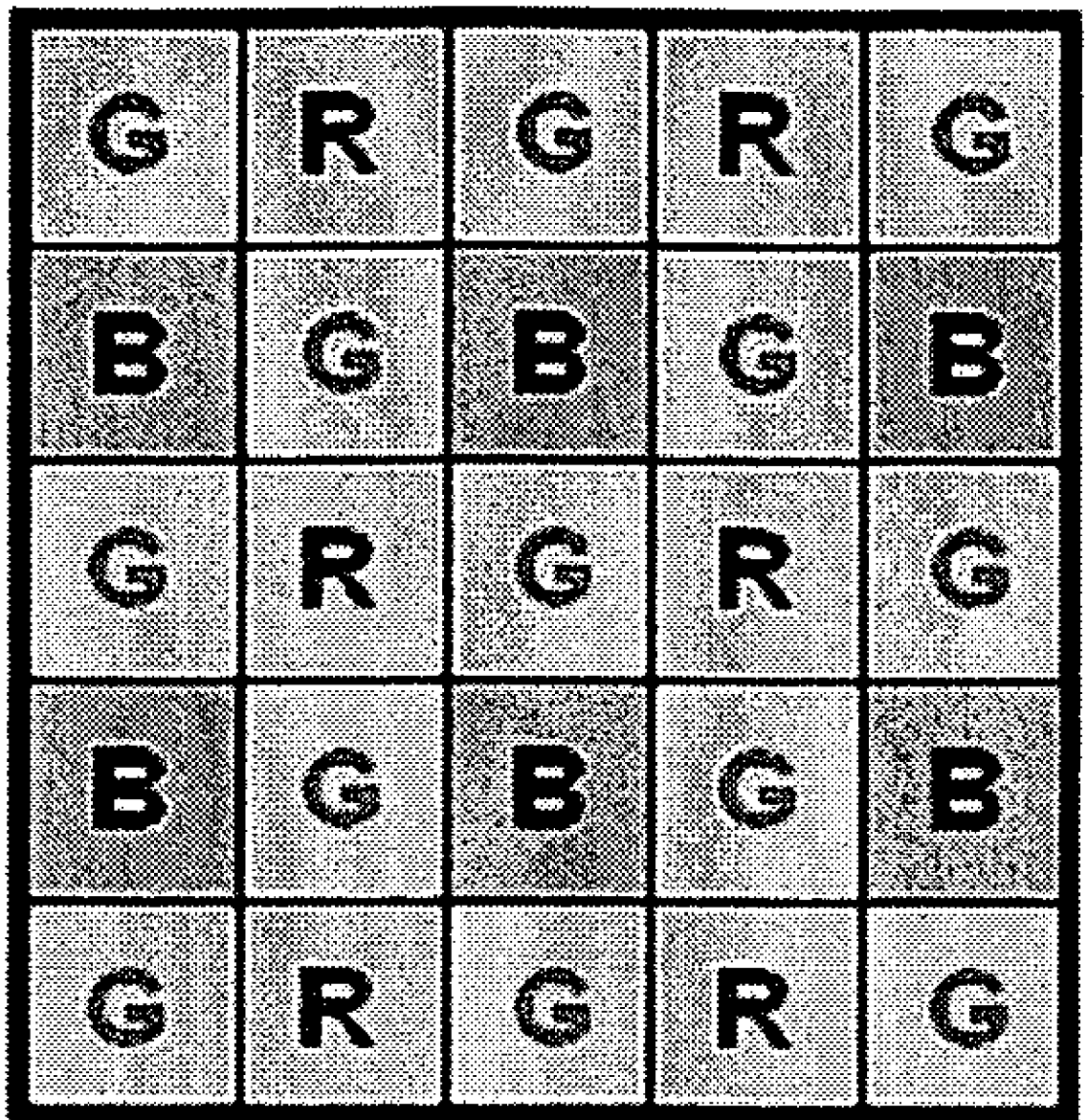
FIG. 1 reproduces a Bayer pattern according to the prior art.

The vertical overlapping of the blocks when scaling a 644× 484 Bayer image is shown in FIG. 6. In the example shown, the size of the input image is not in a standard VGA format on account of the fact that the sample pipeline of FIG. 1 reconstructs some lost lines and columns such that the output may be in a standard VGA format.

In the sample embodiment considered, the reconstructed lines and columns are at boundaries of the image, therefore in these regions the vertical dimension of the input buffer is reduced according to the scaling factor and the size of the scaled output block of pixels. In VGA to QCIF, the needed buffer to obtain a 16×16 block at output is (X_DIM+ov)* (Y_DIM+ov) where X_DIM=58 or 59, Y_DIM=53 or 54, and ov=18.

Figure 7:
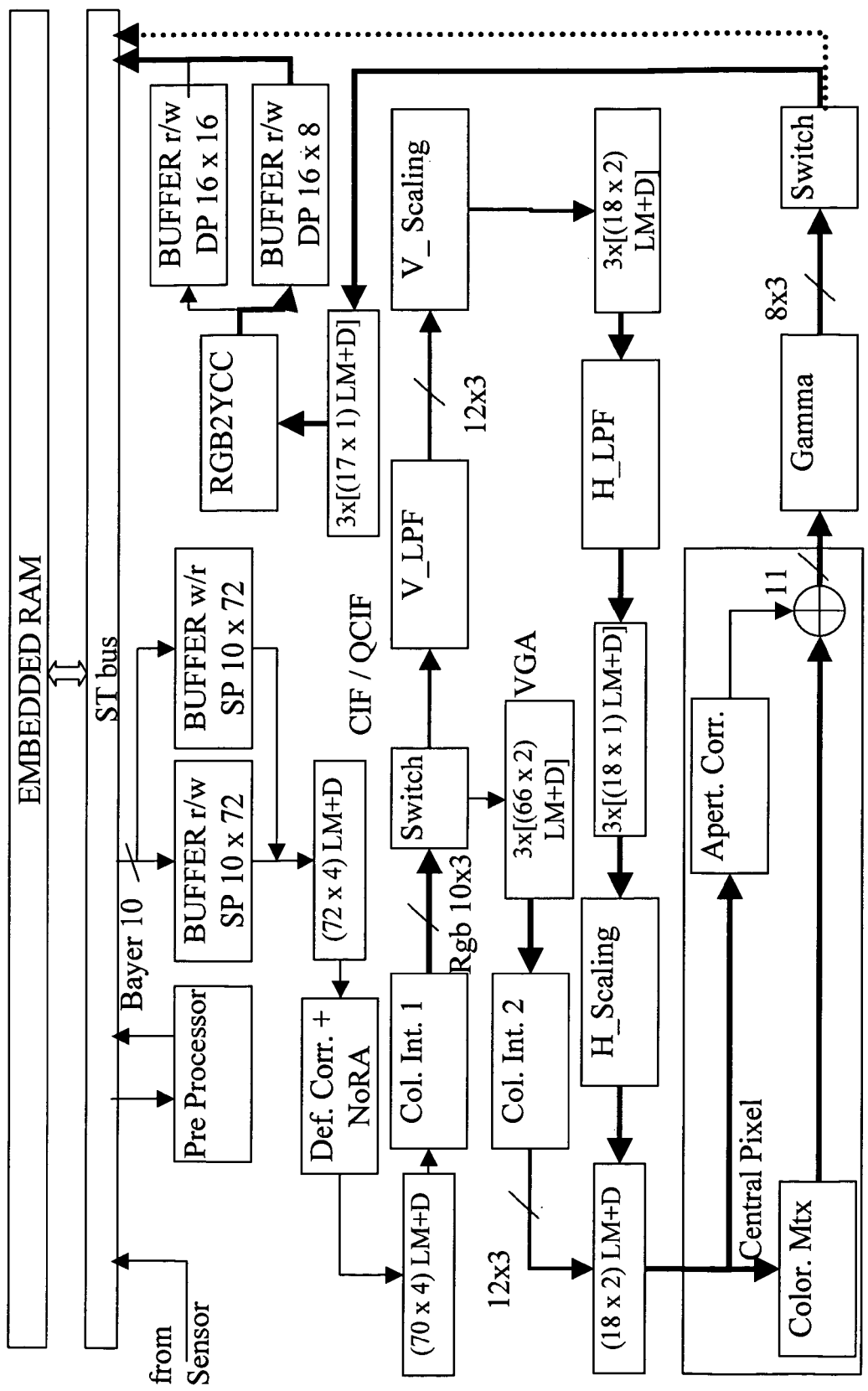
FIG. 7 is a block diagram of an IGP pipeline according to the present invention.

The general architecture of an IGP pipeline functioning in a block mode, according to the invention, is shown in FIG. 7. Compared with the known architecture of FIG. 3, in the architecture of FIG. 7 the following aspects may be observed:

a. The length of the line memories is reduced to the vertical dimension of the InBuffers.

b. Two identical InBuffers are used in a ping pong mode (while one is in a reading mode the second is in a writing mode and vice-versa).

c. The OutBuffer is used to store the macro-block or the MCU to be sent to the Codec.

An advantage of the architecture that derives from operating over blocks of pixels rather than in a usual raster mode in processing pixels values is that the IGP pipeline may be adapted to sensors of any size. This is without the limitations typical of known IGP pipelines operating in a raster mode.

Figure 2:
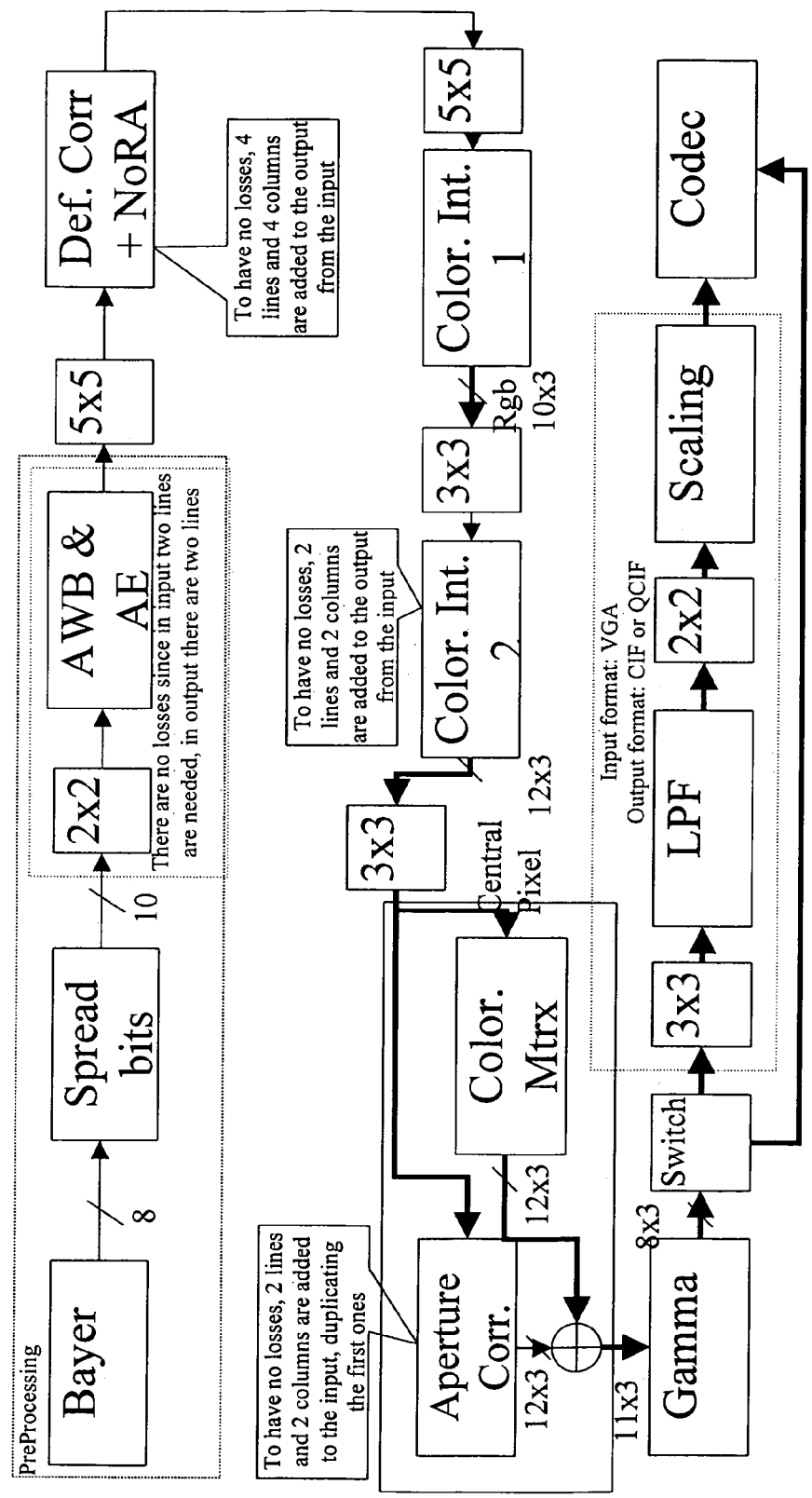
FIG. 2 shows a sample architecture of an IGP according to the prior art.

In the following TABLE II the memory resources are indicated for comparison purposes that are required for an IGP (without the pair of InBuffers according to the invention) of the prior art, as represented in FIG. 2, and of the IGP (with the pair of InBuffers) of the invention.

As may be readily observed, the total memory requirement of the IGP of the invention is practically halved compared to the IGP architecture of the prior art.

TABLE II

ASSUMPTIONS:

Input Image (from sensor): VGA 644 × 484   Output Format: YCC 420
Output Image QCIF 176 × 144   Output BufferSize 16 × 16

MEMORY REQUIRED:

✓With InBuffers:

Buffers 73 × 68 × 10 × 2 + 16 × 16 × 8 + 16 × 8 × 8 = 102352 b = 10 Kb = 12794 B = 12.5 KB
Line memories 68 × 4 × 10 + 64 × 4 × 10 + 60 × 2 × 10 × 3 + 58 × 2 × 12 × 3 + 58 × 11 × 3 + 56 × 2 × 8 × 3 + 54 × 8 × 3 + 16 × 8 × 3 = 16554 b = 16.2 Kb = 2069.3 B = 2.1 KB
Delays 5 × 4 × 10 + 5 × 4 × 10 + 3 × 2 × 10 × 3 + 3 × 2 × 12 × 3 + 3 × 2 × 8 × 3 + 2 × 8 × 3 + 2 × 8 × 3 = 892 b = 0.88 Kb = 111.5 B = 0.2 KB ✓Without buffers:

Line memories 644 × 4 × 10 + 644 × 4 × 10 + 640 × 2 × 10 × 3 + 640 × 2 × 12 × 3 + 640 × 3 × 11 + 640 × 2 × 8 × 3 + 640 × 3 × 8 + 640 × 3 × 8 + 640 × 7 × 8 + 640 × 15 × 8 = 300480 b = 293.5 Kb = 37560 B = 36.7 KB
Delays 5 × 4 × 10 + 5 × 4 × 10 + 3 × 2 × 3 × 10 + 3 × 2 × 12 + 3 × 2 × 8 × 3 + 2 × 8 × 3 + 2 × 8 × 3 = 892 b = 0.9 Kb = 111.5 B = 0.2 KB

| | | |
|---|---|---|
| VERTICAL OVERHEAD: | ✓With InBuffers | 8 × 14 = 112 lines per frame |
| | ✓Without buffers | 0 |
| HORIZONTAL OVERHEAD: | 0 | |
| TOTAL OVERHEAD: | ✓With InBuffers | 112 × 644 = 72128 pixels per frame |
| | ✓Without buffers | 0 |

Figure 3:
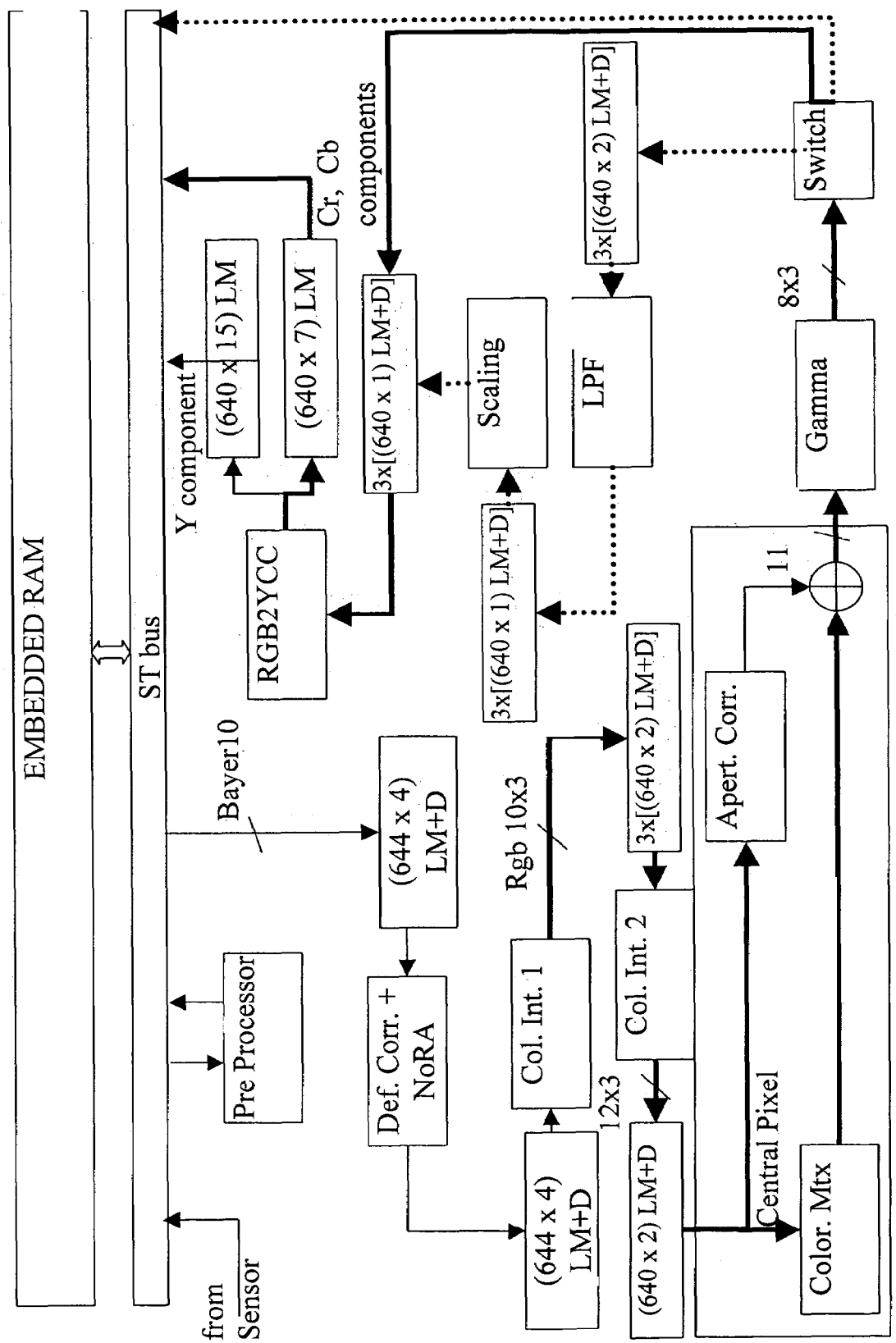
FIG. 3 is a block diagram of a hardware embodiment of the IGP pipeline illustrated in FIG. 2.
Figure 4:
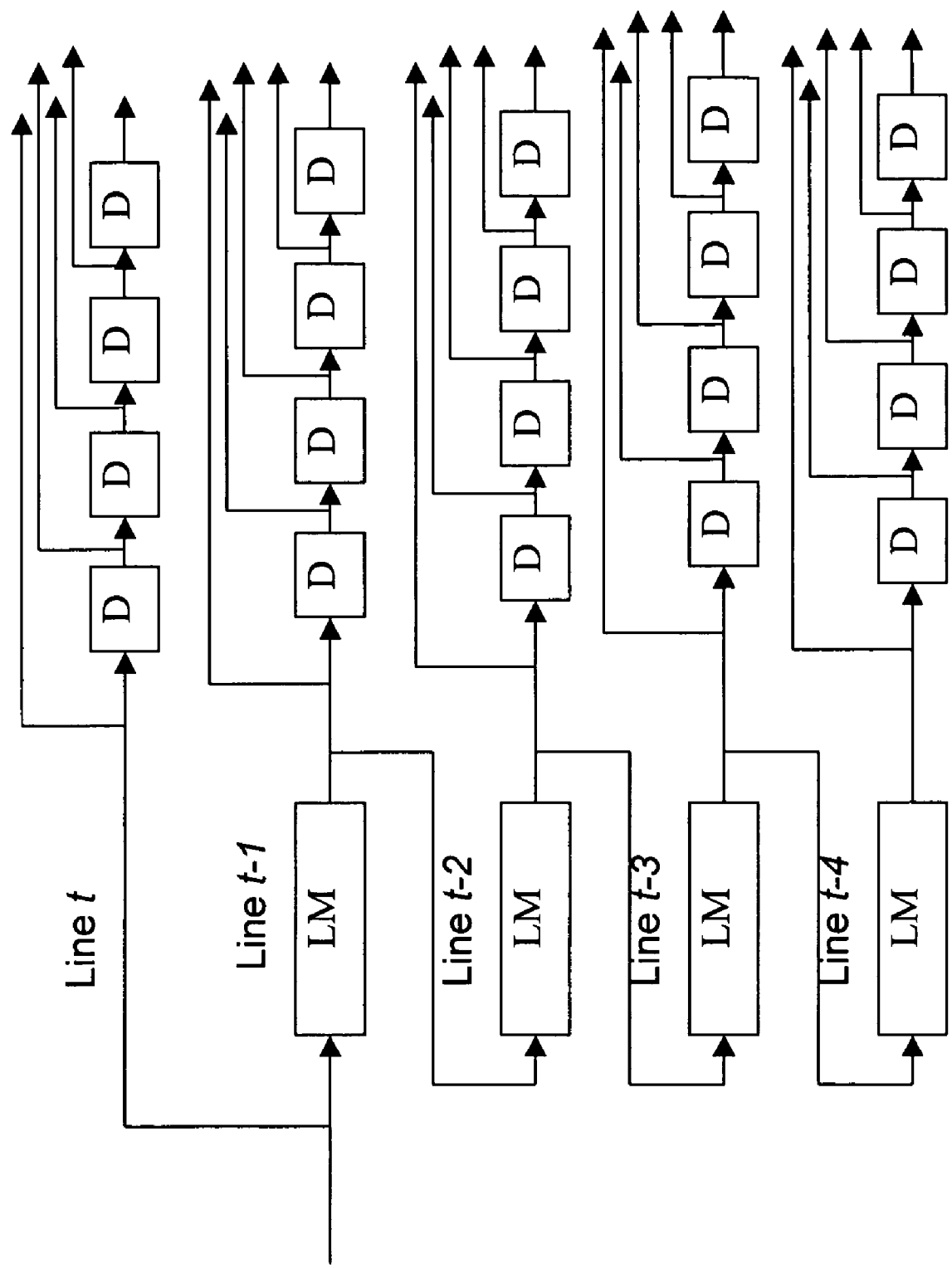
FIG. 4 shows a scheme of line memories and delay circuits that implements a 5×5 filter according to the present invention.
Figure 5:
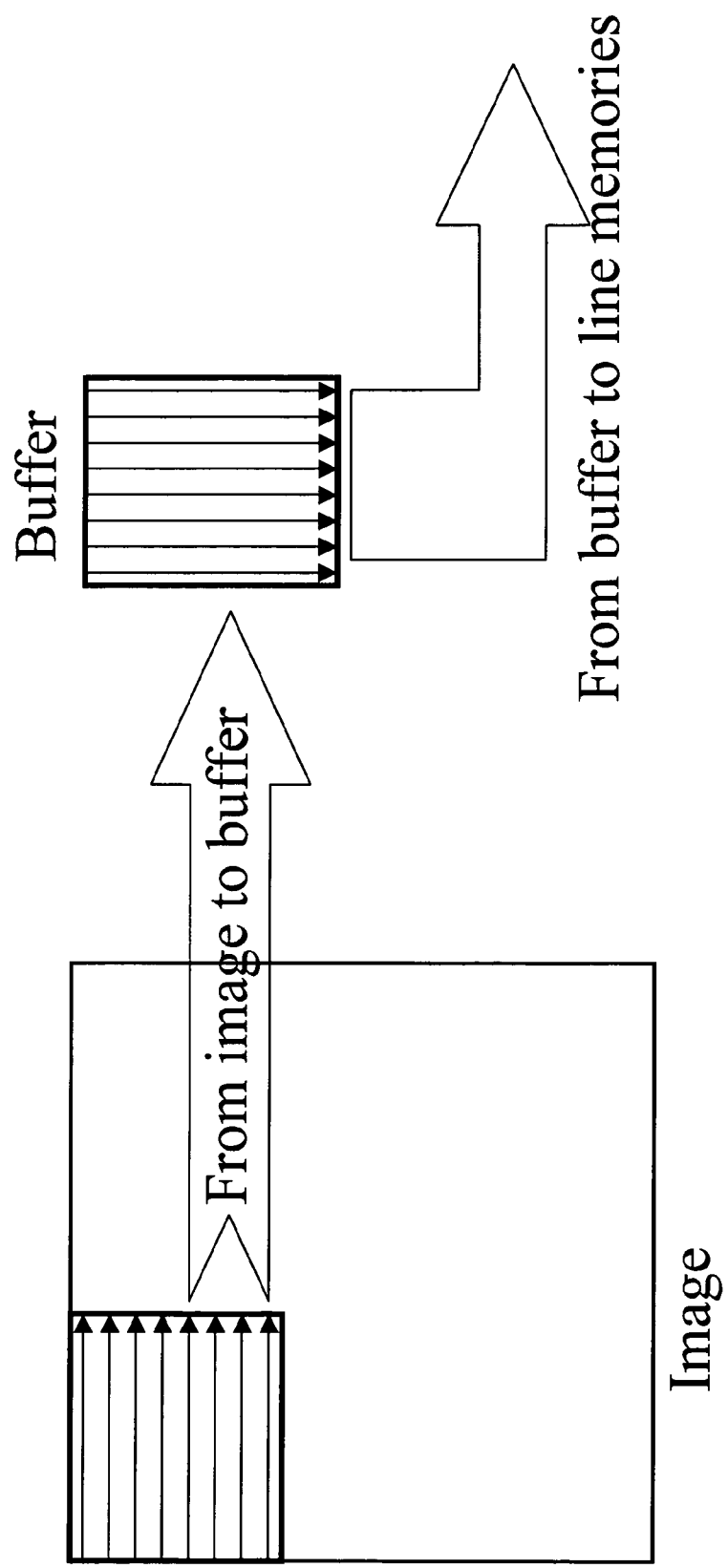
FIG. 5 is a graphical illustration of the inversion of the scanning direction of a block of pixels of a subdivision of a full image, the values of which are acquired and stored in a row-wise mode in an input buffer and read in a column-wise mode for processing pixel values by the functional blocks of the IGP according to the present invention.

The following Table III gives a breakdown of memory resources required by the prior art IGP pipeline of FIG. 3 and by the novel IGP pipeline of FIG. 7, for an immediate comparison.

TABLE III

| | RASTER mode | IGP FOR VGA SENSOR BLOCK mode (invention) |
|---|---|---|
| External Memory | 380.5 KB | 380.5 KB |
| Input Buffers | not present | 2.13 KB |
| Line Memories | 34.10 KB | 1.62 KB |
| TOTAL | 414.6 KB | 384.25 KB |

The following Table IV gives a breakdown of the power consumption in a prior art IGP pipeline of FIG. 3 and in the IGP pipeline of FIG. 7, for an immediate comparison.

TABLE IV

IGP
IN: VGA OUT: VGA YUV 4:2:2
RATE: 15 fps
TECHNOLOGY: HCMOS8D 1V8

| | RASTER mode | BLOCK mode (invention) |
|---|---|---|
| External Memory | 1.9 mW | 8.3 mW |
| Input Buffers | not present | 6.23 mW |
| Line Memories | 23.26 mW | 4.24 mW |
| TOTAL | 25.18 mW | 18.77 mW |

Although in the embodiment shown in FIG. 7 two distinct input buffers are used. It is even possible, as an alternative, to use a single buffer for the same purpose, as disclosed in U.S. Pat. No. 5,151,976 (Artieri), for example. According to the arrangement disclosed in the above-mentioned patent, it is possible to alternately switch from a row-wise to a column-wise scan mode while using a single buffer instead of a pair. This is achieved by overwriting new data in a just read memory location. A dedicated address generator is to be introduced for controlling access to the buffer.

Figure 8:
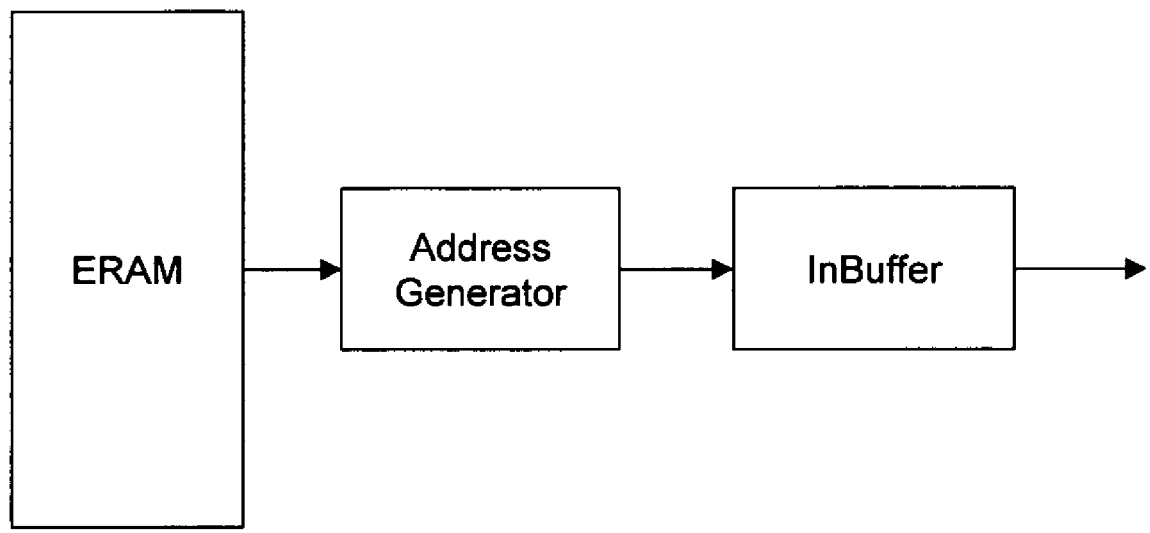
FIG. 8 shows an alternative manner of implementing a single input buffer of the IGP pipeline instead of a pair of buffers for enabling writing of incoming data row-wise and reading of stored data for processing column-wise according to the present invention.

FIG. 8 depicts the structure that can be used in lieu of the pair of input buffers of the IGP pipeline scheme of FIG. 7.

According to such an alternative use of a single buffer, the latter may be an SP memory, provided the number of cycles used by the IGP pipeline to process a block of pixels is at least 2N, where N is the number of pixels stored in the memory buffer (to be validated for performing CoWare simulations).

The address generator may be a ROM memory or a simple circuit comprising three registers, three addresses, one multiplier and two selectors. The output buffers that are shown in the scheme of FIG. 7 are used to store an output block of processed pixels. If the Codec block to which the processed-block of pixels are to be fed includes internal buffers, the output buffer, shown in the embodiment of FIG. 7 may not be necessary as their function may be performed by the input buffers present in the Codec.

That which is claimed is:

1. A color image processing pipeline for performing, among corrective and image enhancement steps, at least an interpolation on color data to generate triplets located at distinct pixel locations, the pipeline comprising:
    a plurality of defect correction and image enhancement blocks comprising at least a first color interpolation block generating RGB information for each pixel of an input image pixel pattern, and a second color interpolation block receiving the RGB information from said first color interpolation block and providing enhanced RGB pattern pixels;
    a plurality of dedicated line memories and delay circuits associated with said plurality of defect correction and image enhancement blocks for permitting real-time processing of pixel data; and
    first and second read/write buffers having an identical capacity for storing a subset or pixel block of the image data, and for inverting a scanning mode of pixel data being fed to said plurality of dedicated line memories and delay circuits associated to at least said first color interpolation block, from row-wise to column-wise, for each subset of data to be stored therein.

2. A color image processing pipeline according to claim 1, wherein for given dimensions of a processed subset or block of pixels to be output by the pipeline, the dimensions of the subset or pixel block of image data respectively written in and read from said first and second read/write buffers correspond to:

$$X*SF_{hor}+OV_{hor}, \text{ and}$$

$$y*SF_{ver}+OV_{ver}$$

with SF being a scaling factor in the respective dimension, and OV being a measure of the computational overhead in the respective dimension corresponding to the number of lines and columns that are lost in the pipeline, and which is null for the horizontal dimension because of the translation of the scanning mode of said pair of first and second read/write buffers when feeding pixel data to the pipeline.

3. A color image processing pipeline according to claim 1, wherein the given dimensions of the processed subset or block of pixels to be output by the pipeline are 16*16.

4. A color image processing pipeline comprising:
a plurality of defect correction and image enhancement blocks comprising a first color interpolation block generating RGB information for each pixel of an input image pixel pattern, and a second color interpolation block receiving the RGB information from said first color interpolation block and providing enhanced RGB pattern pixels;
a plurality of dedicated line memories and delay circuits associated with said plurality of defect correction and image enhancement blocks for permitting real-time processing of pixel data; and
first and second buffers for storing a subset or pixel block of the image data, and for inverting a scanning mode of pixel data being fed to said plurality of dedicated line memories and delay circuits associated to at least said first color, interpolation block, from row-wise to column-wise, for each subset of data to be stored therein.

5. A color image processing pipeline according to claim 4, wherein said first and second buffers comprise read/write buffers.

6. A color image processing pipeline according to claim 4, wherein said first and second buffers are the same size.

7. A color image processing pipeline according to claim 4, wherein for given dimensions of a processed subset or block of pixels to be output by the pipeline, the dimensions of the subset or pixel block of image data respectively written in and read from said first and second buffers correspond to:

$X*SF_{hor}+OV_{hor}$, and $y*SF_{ver}+OV_{ver}$ with SF being a scaling factor in the respective dimension, and OV being a measure of the computational overhead in the respective dimension corresponding to the number of lines and columns that are lost in the pipeline, and which is null for the horizontal dimension because of the translation of the scanning mode of said pair of first and second buffers when feeding pixel data to the pipeline.

8. A color image processing pipeline according to claim 4, wherein the given dimensions of the processed subset or block of pixels to be output by the pipeline are 16*16.

9. A method for reducing line memory without increasing overhead in a color image pixel data processing pipeline comprising:
interpolating chrominance data to generate triplets located at distinct, pixel locations;
generating RGB information for each pixel of an input image pixel pattern using at least a first color interpolation block, :and inputting the RGB information to a second color interpolation block for providing enhanced RGB pattern pixels, the first and second color interpolation blocks being part of a plurality of defect correction and image enhancement blocks;
permitting real-time processing of pixel data based upon a plurality of dedicated line memories and delay circuits associated with the plurality of defect correction and image enhancement blocks;
storing a subset or pixel block of the image data in first and second read/write buffers having an identical capacity; and
inverting a scanning mode of pixel data being fed to the plurality of dedicated line memories and delay circuits associated to at least the first color interpolation block, from row-wise to column-wise, for each subset of data to be stored therein.

10. A method according to claim 9, wherein for given dimensions of a processed subset or block of pixels to be output by the pipeline, the dimensions of the subset or pixel block of image data respectively written in and read from said first and second, read/write buffers correspond to:

$X*SF_{hor}+OV_{hor}$, and $y*SF_{ver}+OV_{ver}$ with SF being a scaling factor in the respective dimension, and OV being a measure of the computational overhead in the respective dimension corresponding to the number of lines and columns that are lost in the pipeline, and which is null for the horizontal dimension because of the translation of the scanning mode of said pair of first and second read/write buffers when feeding pixel data to the pipeline.

11. A method according to claim 9, wherein the given dimensions of the processed subset or block of pixels to be output by the pipeline are 16*16.

12. A method for processing color data comprising:
interpolating chrominance data to generate triplets located at distinct pixel locations;
generating RGB information for each pixel of an input image pixel pattern using at least a first color interpolation block, and inputting the RGB information to a second color interpolation block for providing enhanced RGB pattern pixels, the first and second color interpolation blocks being part of a plurality of defect correction and image enhancement blocks;
permitting real-time processing of pixel data based upon a plurality of dedicated line memories and delay circuits associated, to and cooperating with the plurality of defect correction and image enhancement blocks;
storing a subset or pixel block of the image data in first and second buffers; and
inverting a scanning mode of pixel data being fed to the plurality of dedicated line memories and delay circuits associated to at least the first color interpolation, block, from row-wise to column-wise, for each subset of data to be stored therein.

13. A method according to claim 12, wherein said first and second buffers comprise read/write buffers.

14. A method according to claim 12, wherein said first and second buffers are the same size.

15. A method according to claim 12, wherein for given dimensions of a processed subset or block of pixels to be output by the pipeline, the dimensions of the subset or pixel block of image data respectively written in and read from said first and second buffers correspond to:

$X*SF_{hor}+OV_{hor}$, and $y*SE_{ver}+OV_{ver}$ with SF being a scaling factor in the respective dimension, and OV being a measure of the computational overhead in the respective dimension corresponding to the number of lines and columns that are lost in the image processing pipeline, and which is null for the horizontal dimension because of the translation of the scanning mode of said pair of first and second buffers when feeding pixel data to the pipeline.

16. A method according to claim 12, wherein the given dimensions of the processed subset or block of pixels to be output by the pipeline are 16*16.

* * * * *

UNITED STATES PATENT AND TRADEMARK OFFICE
CERTIFICATE OF CORRECTION

PATENT NO.       : 7,397,944 B2
APPLICATION NO.  : 11/119223
DATED            : July 8, 2008
INVENTOR(S)      : Spampinato et al.

It is certified that error appears in the above-identified patent and that said Letters Patent is hereby corrected as shown below:

| | |
|---|---|
| Column 2, Lines 6-7 | Delete: "very-importance"<br>Insert: --very important-- |
| Column 2, Line 63 | Delete: "Apcor"<br>Insert: --Ap Corr-- |
| Column 3, Line 31 | Delete: "Dcache"<br>Insert: --cache-- |
| Column 8, Line 21 | Delete: "processed-"<br>Insert: --processed-- |
| Column 9, Line 49 | Delete: ":and"<br>Insert: --and-- |
| Column 10, Line 21 | Delete: "associated,"<br>Insert: --associated-- |
| Column 10, Line 51 | Delete: "$y * SE_{ver} + OV_{ver}$"<br>Insert: --$Y * SF_{ver} + OV_{ver}$-- |

Signed and Sealed this

Seventh Day of October, 2008

JON W. DUDAS
*Director of the United States Patent and Trademark Office*